July 4, 1961

F. M. MARCOSKY 2,990,759

BINOCULAR ADAPTER FOR CAMERAS

Filed April 27, 1959

INVENTOR.
Frank M. Marcosky
BY
*Christy, Parmelee, Strickland*
ATTORNEYS

July 4, 1961  F. M. MARCOSKY  2,990,759
BINOCULAR ADAPTER FOR CAMERAS
Filed April 27, 1959  2 Sheets-Sheet 2

INVENTOR.
Frank M. Marcosky
BY
Christy, Parmelee & Strickland
ATTORNEYS

United States Patent Office 2,990,759
Patented July 4, 1961

2,990,759
BINOCULAR ADAPTER FOR CAMERAS
Frank M. Marcosky, 1548 Shady Ave., Pittsburgh, Pa.
Filed Apr. 27, 1959, Ser. No. 809,301
4 Claims. (Cl. 95—12)

This invention is for an adapter by which binoculars may be adapted to cameras to provide a telescopic lens system for taking pictures. It is especially useful for so-called stereo cameras which simultaneously make dual exposures, but may be used equally well with single lens cameras.

The adapter as herein described may be used with all current models of stero cameras presently available in this country, and with practically all makes of 35 mm. cameras now available.

It is of course well understood that a binocular must be focused for changes of distance between the viewer and the object being viewed. Consequently, when using a binocular with a camera, the eye piece of the binocular must be accessible for focusing the binocular as the disstance of the object from the photographer changes in one view after another.

My invention has for its principal object to provide an adapter which will so fix the relationship of the camera and binocular as to properly photograph the view at the eye piece of the binocular, but which enables one to be instantly moved away from the other so that the operator may focus the binocular and then quickly bring the camera back to position at the eye piece of the binocular. The term "eye piece" as here used contemplates both eye pieces of the binocular where a stereo camera is used, or the eye piece of a single one of the scopes of the binocular where a single exposure camera is used.

A further object of my invention is to provide an adapter for this purpose which can be manufactured inexpensively, and which is simple to operate so that even a novice can secure good telescopic pictures without the added expense of a telescopic lens. This is especially important with stereo cameras in which no system of telescopic lenses is, to my knowledge available, at least at modest expense.

A further object of my invention is to provide an adapter for this purpose from which both the camera and the binocular can be readily disengaged for normal independent use and quickly reassembled when they are to be used together.

These and other objects and advantages are secured by my invention, which may be more fully understood by reference to the accompanying drawings, in which.

Figure 2:
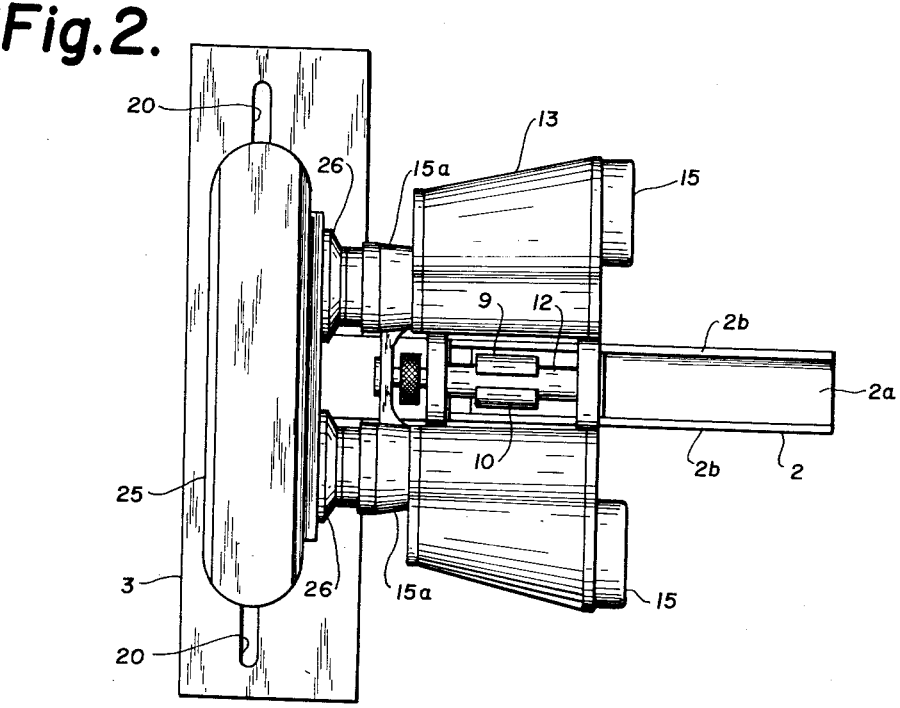
FIG. 2 is a top plan view of FIG. 1.

Referring to the drawings, the adapter is comprised of two main parts 2 and 3. Part 2 is preferably in the form of a narrow extruded channel of aluminum or other metal, aluminum being preferred because it is strong and light, non-rusting, and relatively inexpensive. The channel 2 has a flat bottom web 2a and parallel upstanding flanges 2b, one flange being along each edge of the web. The confronting or inner faces of these flanges are provided with grooves 2c along their lengths. The groove along each flange is below the top edge of the flange.

The flanges with their grooves provide a guideway in which there is a longitudinally-movable supporting plate 4. This plate is provided with a threaded post 5 projecting upwardly therefrom. The post is entered into the base of a binocular support 6. This support has a depending bushing 7 through which the post extends, and there is a knurled nut 8 at the bottom of the bushing having threaded engagement with the post. By turning the nut 8 the binocular support may be adjusted vertically. The binocular support itself has two upwardly-extending jaws, one of these, designated 9, being integral with the support, and the other, 10, being separate and adjustably fixed to the body of the support by screws, such as screws of the "Allen" type indicated at 11. These jaws have complementary recesses in their confronting upper ends adapted to clamp the center bar 12 of a conventional binocular 13. Various binoculars have center bars of different diameters, and by setting the screws 11, the jaws may be adapted to all of the range of sizes that would be encountered. The jaws are relatively short in the direction of the length of the binoculars, so that they engage only a portion of the entire length of the center bar, and hence do not interfere with the center focusing adjustment. The jaws also provide clearance so that the angular adjustment of the binoculars closer together or further apart is not substantially restricted.

The supporting plate 4 has a jam screw 14 at its forward end that is threaded through the plate 4, and it has a knurled knob 14a at its upper end. By screwing down on the jam screw 14, it will bear against the web 2a of the channel and force the plate 4 into binding relation with the grooves 2c along which the plate is slidable, thereby releasably holding the binocular support in any position on the member 2 where it is to be adjustably fixed.

The binoculars 13 are of any usual type with twin scopes 15 and eye pieces 15a, and they may be of the center focus or individually focused type.

Figure 1:
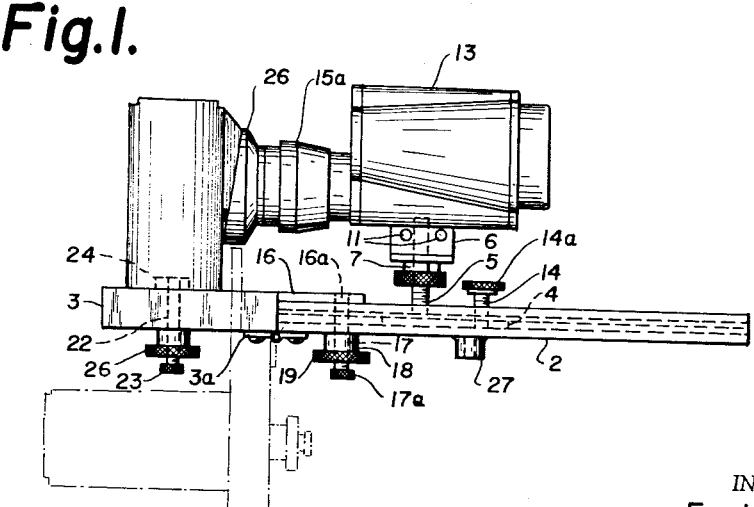
FIG. 1 is a side elevation of the adapter with a stereo camera and binocular in position thereon.

The other part 3 of the device is the camera holder, and it is desirably in the form of a rectangular panel or platform elongated in a direction transverse to the axis of the channel member 2. One of its long square sides butts against one square end of the member 2, and the two are connected by a hinge or hinges 3a on the under side of the panel and of the channel member 2, the hinge holding the long side of the panel 3 flat against the end of the channel, as shown in FIG. 1. Viewed from the top, as in FIG. 2, the adapter is of T-shape, with the part 2 forming the stem and the part or panel 3 forming the bar. On the top of the panel 3 is a forwardly-projecting rigid tongue 16 that normally lies flat against the top of the flanges of the channel 2. A bolt 17 threaded up through a bushing 18 under the channel member 2 has its upper end screwed into a threaded hole 16a in this tongue. The lower end of the screw or bolt 16 has a knurled head 17a, and there may be a knurled jam nut 19 on the bolt below the bushing 17. This bolt, when screwed into the hole 16a, holds the panel 3 in the plane of the channel 2, but it may be unscrewed with a couple of turns to let the member 3 swing down on its hinges to a position at right angles to said plane or to a greater angle, as indicated in dotted lines in FIG. 1.

The panel 3 has a slot 20 therethrough extending throughout the greater portion of its length. A screw 22 with a knurled head 23 extends up through this slot into the tripod screw-receiving socket 24 that is always provided in the base of any camera, the camera being indicated as 25. A jam nut 26 on the screw bears against the bottom of the panel to hold the screw and camera at any position to which it is adjusted along the slot 20, thus releasably clamping and holding the camera on the top of the panel. The camera here shown is a conventional type of stereo camera with two lens mounts 26 at the front thereof. On any stereo camera the distance between lens centers is within the maximum width of separation of the two eye pieces of the binocular.

On the under side of the channel 2 there is an internally threaded stud 27 for attaching the adapter to the usual camera engaging screw at the top of a conventional type of camera tripod, not shown.

Assuming a stereo camera to be mounted on the channel 2, and a conventional prism type binocular to be on the support, and the locking screw 17 set to hold the panel 3 level with the channel 2, the binocular is raised or lowered to the height of the camera lenses and the camera is shifted along the slot 20 to line up its lenses with eye pieces 15a of the binocular, and the slide or support plate 4 is shifted lengthwise so that the eye pieces of the binocular just encircle the lens mounts of the camera. When the parts are all in proper position the various locking screws are set to maintain this relation. Usually the adapter will be on the tripod at this time, but not necessarily so.

With the parts thus related and adjusted the operator is ready to take a picture. In so doing, he releases the holding screw 17 from the tongue or extension 16, so that the panel 3 may swing in a vertical arc and drop the camera down out of position in front of the binocular and out of the way. The binocular is then focused by loooking through it in the usual way at the object or scene to be photographed. Since the channel 2 and panel 3 are so proportioned that the eye pieces of the binocular are at the viewing end of the channel 2, the channel offers no impediment to the focusing of the binocular. Unless the operator has equal vision in both eyes, it is advisable, with a stereo camera, to use only one eye in focusing both scopes of the binocular. The binocular, if of the center focusing type, usually has one adjustable eye piece in addition to the center focusing adjustment, which makes it desirable with a stereo camera to focus both scopes.

Having focused the binocular, the panel 3 on which the camera has been mounted, is swung up into position and clamped by turning the screw 17. By this procedure the binocular and camera are almost instantly restored to their proper related positions. The camera should be set to "infinity" and the lens opening should be set at not less than f.3.5, since at a smaller setting, as f.8, for example, the picture or pictures on the film would then be "moons," that is, the picture on a stereo camera would be two circular pictures, since at the smaller lens opening the view would be insufficient to cover the entire film area. If it is a single lens camera, the picture would be a single circular picture less than the film area. To compensate for the larger lens opening, the operator of course will learn to adjust the shutter to a higher speed to avoid over-exposure. It is a familiar fact that as the distance of an object from the binocular changes, the binocular focus must be changed, so it is an important feature of my invention that once the user has set his camera and binoculars in proper position, the camera can be quickly moved out of position to afford access to the eye pieces of the binocular and then moved back into position without requiring individual adjustment of the camera and binocular each time. This of course is achieved by hingedly connecting the camera holder 3 and the binocular holder comprising the part 2 and the elements carried by it. When the panel 3 is dropped down out of operative position in front of the binocular, the tongue 16 is between the two scopes of the binocular and therefore does not interfere with the use of the binocular for focusing.

Figure 4:
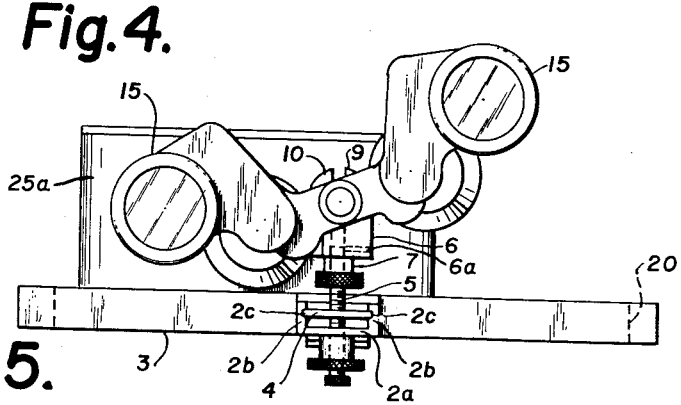
FIG. 4 is a front elevation showing the adapter in use with a single lens camera having the lens opening located close to the bottom of the camera.

The procedure with a single lens camera is the same as with a stereo camera, except that only one scope of the binocular need be focused. Stereo cameras are largely of overall uniform pattern, whereas single lens cameras come in a much wider variety of shapes and styles, even with 35 mm. film, for which cameras this invention is most useful. Consequently, more intricate adjustment of the binocular and camera may be required, even to the extent, as indicated in FIG. 4, of tilting the binocular in its clamp to lower one scope and raise the other. The clamping arrangement for engaging the center bar of the binocular enables this to be easily accomplished. In FIG. 4, corresponding reference numerals have been used to designate the corresponding parts, except that the single lens camera here diagrammed is designated 25a. This figure shows such transverse tilting of the binocular.

The adapter as herein described is light and may be carried in a gadget bag commonly used by photographers. The camera and the binoculars can be used separately at any time, and neither has to be modified in any way for use on the adapter. It should be here pointed out that the post 5 is not threaded into the binocular support 6, but simply slides into the support. A set screw, such as an "Allen" type screw 6a in the support can be tightened against the post 5 after the binocular has been adjusted to the camera by turning the nut 8. To use the binocular separate from the camera, the set screw 6a is loosened and the binocular with the support 6 is lifted off the post. The support 6 does not interfere with the separate use of the binoculars or with the insertion of the binoculars in their usual carrying case. Once a photographer has become used to adjusting his binoculars and his own camera to each other on the adapter, he can do it simply and quickly, and even scratch index marks thereon to facilitate the operation. The fore-and-aft adjustment of the binocular support on the channel 2 makes it possible to accommodate binoculars of various lengths. Conveniently the panel 3 may be made of clear plastic, so that a visible record of previous exposures can be taped to the under surface of the panel with pressure-sensitive adhesive tape and be easily read while being protected.

Figure 3:
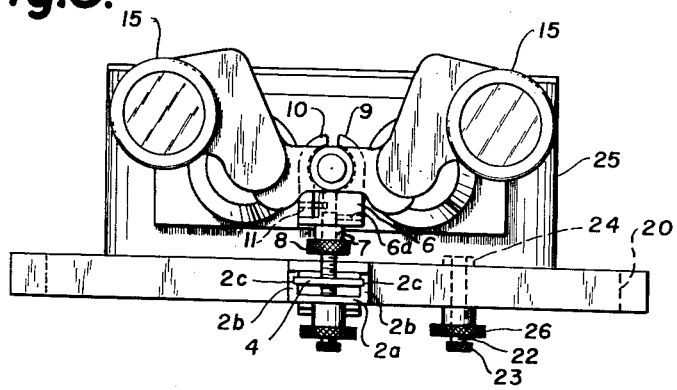
FIG. 3 is a front elevation of FIG. 1.
Figures 5, 6:
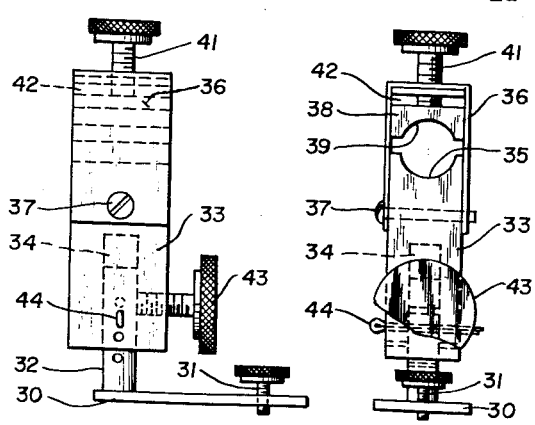
FIG. 5 is a side elevation of another form of binocular support which may be used in lieu of the one shown in FIGS. 1 to 4.
FIG. 6 is a front view of the support shown in FIG. 5.

In FIGS. 5 and 6, 30 indicates a slide plate corresponding to plate 4 of FIGS. 1 to 3, adapted to slide in the guideway of the binocular supporting member, and it has a jam screw 31 corresponding to 14 of FIGS. 1 to 3. There is a post 32 on the plate 30, the post being smooth instead of threaded. There is a binocular-supporting block 33, here shown as being made of transparent plastic with a hole 34 extending up into it from the bottom, and in which the post 32 has a close sliding fit. The top of the post is grooved, as indicated at 35, to receive the center bar of a binocular (not shown). A metal strap 36 is removably secured to the sides of the block 33 by a screw 37, the strap being of a square arch-like shape. There is a clamping block 38 loosely received under this strap having a groove 39 complementary to the groove 35 in the block. A set screw 41 with a knurled knob passes through the top of the strap and bears against a plate 42 above the clamping block 38.

There is a set screw 43 that enters one side or end face of the supporting block 33 threaded into the block and movable into clamping engagement with the post 32.

In use, the strap 36 is removed by removing screw 37 and the clamping block 38 is also removed. The center bar of the binocular is set into the groove 35, with the binoculars folded upwardly to afford access for reinserting the screw 37. The strap 36 is put back in position and screw 37 is put back in place. The clamping block 38 is then slipped in endwise under plate 42 and the screw 41 tightened down. The block 33 is then lowered onto the post 32 to the proper level and screw 43 tightened. If desired, the block 33 may also have a hole or holes drilled therethrough and the post 32 have a series of similar holes therethrough. The block 33 is adjusted to a position where registering holes in the block and post are nearest the desired level, and a pin 44 inserted therethrough. The hinging of the binoculars will usually take care of any discrepancy between the height so determined and the lens of the camera where a single lens camera is used, and the holes are positioned for all three present models of stereo or so-called three-dimensional cameras now available, because where the binoculars are used with a stereo camera the binoculars must be fully spread to align with the camera lenses.

To use the binocular separately from the adapter, the screw 43 is loosened and the pin 44 removed and the supporting block 33 remains attached to the binocular, but does not interfere in any way with using the binocular.

While I have shown and described certain present preferred embodiments of my invention, various changes and modifications may be made within the contemplation of my invention and under the scope of the following claims.

I claim:

1. An adapter of the class described comprising an elongated metal channel, a binocular support slidably mounted in said channel, means for releasably holding the binocular support against movement along the channel, a camera supporting panel at one end of the channel elongated in a direction transverse to the length of the channel, a hinge on the bottom of the channel and the bottom of the panel for hingedly connecting the two and holding the parts in a position where the panel can move in an arc only from the plane of the channel downwardly perpendicular thereto while limiting the panel against hinging upwardly beyond the plane of the channel, means for releasably holding the panel and channel in a common plane, camera-holding means adjustable along the panel in a direction transverse to the length of the channel, said binocular support comprising a clamp having adjustable confronting jaws for embracing and clamping the center bar of a binocular, and means for adjusting the clamp vertically relative to the channel.

2. An adapter for utilizing a binocular as a telephoto lens for a camera having either a single lens or dual lenses for stereo pictures, said adapter comprising a supporting post, binocular clamping means on the post for releasably clamping and rigidly engaging a binocular frame structure and holding the binocular perpendicular to the post, an adapter member on which the post is mounted and to which the post is perpendicular, the post being adjustably movable in a fore-and-aft direction on said member for adjusting the position of the post and a binocular mounted thereon on the body, means for releasably holding the post against movement on said member, a second adapter member providing a camera support, means for securing a camera on said second adapter member adjustable on said adapter member transversely to the direction in which the post is adjusted with the camera lens front confronting the eye piece of the binocular on the support on said first member, means connecting said first and second members for movement from a position where the lens front of the camera is against an eye piece of the binocular to a position where the camera is removed from the eye piece of the binocular while the camera and binocular remain fixed on their respective members and for bringing such members back into said relation where the camera lens front is against the eye piece of the binocular, and means for releasably holding said members in the last-named position.

3. An adapter for taking photographs through binoculars comprising two principal members, one of said members having a binocular support longitudinally adjustable therealong, a binocular clamp on said support having means for releasably engaging and fixedly holding the center shaft of a binocular frame at right angles to the vertical axis of the post, the other principal member having transversely-adjustable camera securing means thereon, means connecting the two members for relative movement in a vertical arc whereby a camera mounted on said one member may be moved into and out of operating position relative to binoculars engaged by the clamp on said support on the other member to enable the binoculars to be focused with the camera moved out of operative position while the position of the camera and binoculars on their respective members remain fixed, and means for releasably holding the said principal members against relative movement when the camera is to remain in operable relation to the binocular.

4. An adapter of the class described comprising two principal members one of which is movable with respect to the other into and out of operative relation, one of said members having a binocular supporting member thereon perpendicular thereto and adjustably movable therealong, a clamp at the top of said binocular supporting member for releasably but rigidly engaging a binocular center frame member, the other of said two principal members having a camera-retaining means thereon adjustable therealong in a direction transverse to the direction in which the binocular support is adjustable whereby a binocular and camera may be positioned on the respective principal members with the lens front of the camera against the eye piece of a binocular when the two principal members are in operative position, means connecting the two principal members for relative movement from said operating position to a position where the camera mounted on the second member is clear of the eye pieces of a binocular supported in said clamp while the position of the camera and binoculars on the respective principal members remains fixed, and means for releasably holding the two principal members in operative position against such relative movement.

References Cited in the file of this patent

UNITED STATES PATENTS

| | | |
|---|---|---|
| 1,973,542 | Shull | Sept. 11, 1934 |
| 2,679,197 | Francisco | May 25, 1954 |
| 2,765,718 | Beecher | Oct. 9, 1956 |